US012609949B2

(12) United States Patent
Alroobaea et al.

(10) Patent No.: US 12,609,949 B2
(45) Date of Patent: Apr. 21, 2026

(54) SYSTEM AND METHOD FOR DNN-BASED CYBER-SECURITY USING FEDERATED LEARNING-BASED GENERATIVE ADVERSARIAL NETWORK

(71) Applicants: Taif University, Taif (SA); Roobaea Alroobaea, Taif (SA)

(72) Inventors: Roobaea Alroobaea, Taif (SA); Poongodi Manoharan, Doha (QA)

( * ) Notice: Subject to any disclaimer, the term of this patent is extended or adjusted under 35 U.S.C. 154(b) by 301 days.

(21) Appl. No.: 18/299,668

(22) Filed: Apr. 12, 2023

(65) Prior Publication Data

US 2023/0308465 A1      Sep. 28, 2023

(51) Int. Cl.
  *G06F 21/00*       (2013.01)
  *H04L 9/40*        (2022.01)

(52) U.S. Cl.
  CPC ........ *H04L 63/1425* (2013.01); *H04L 63/205* (2013.01)

(58) Field of Classification Search
  CPC .......................... H04L 63/1425; H04L 63/205
  See application file for complete search history.

(56) References Cited

U.S. PATENT DOCUMENTS

2019/0220605 A1*   7/2019   Kounavis ............... G06N 3/045
2020/0175379 A1*   6/2020   Wu ........................ G06N 3/084
2020/0252296 A1*   8/2020   Lashyn .................. G06N 20/00
2021/0110045 A1*   4/2021   Buesser ................. G06N 3/045
2022/0108177 A1*   4/2022   Samek .................. G06N 3/045
2022/0172050 A1*   6/2022   Dalli ...................... G06N 3/047
2022/0180203 A1*   6/2022   Zhou ..................... G06N 3/047
2022/0261626 A1*   8/2022   Liu ......................... G06N 3/063
2024/0303504 A1*   9/2024   Xu .......................... G06N 3/098

* cited by examiner

*Primary Examiner* — Michael M Lee

(74) *Attorney, Agent, or Firm* — Perilla Knox & Hildebrandt LLP; Kenneth A. Knox

(57)         ABSTRACT

The system comprises a FL-based generative adversarial network (GAN) for generating adversarial examples, wherein the GAN includes a generator for generating the adversarial examples and a discriminator for distinguishing the adversarial examples from the original data, wherein the FL network includes multiple clients, each having a local dataset and a local DNN model, and a central server for coordinating the training process; a DNN for classifying data, where the DNN is trained using the generated adversarial examples, wherein the training process includes exchanging the model updates between the client's server and the central server; an evaluation module for measuring the adversarial accuracy and adversarial robustness of the DNN using appropriate metrics, including the adversarial accuracy, the adversarial loss, and the robustness to perturbations; and an adjustment module for adjusting the architecture or parameters of the DNN based on the evaluation results to improve its adversarial robustness.

16 Claims, 9 Drawing Sheets

200

100 generator 104 discriminator 106 client's server 110 central server 112

FL-based generative adversarial network (GAN) based module 102 deep neural network (DNN) based module 108 evaluation module 114 adjustment module 116 testing module 118

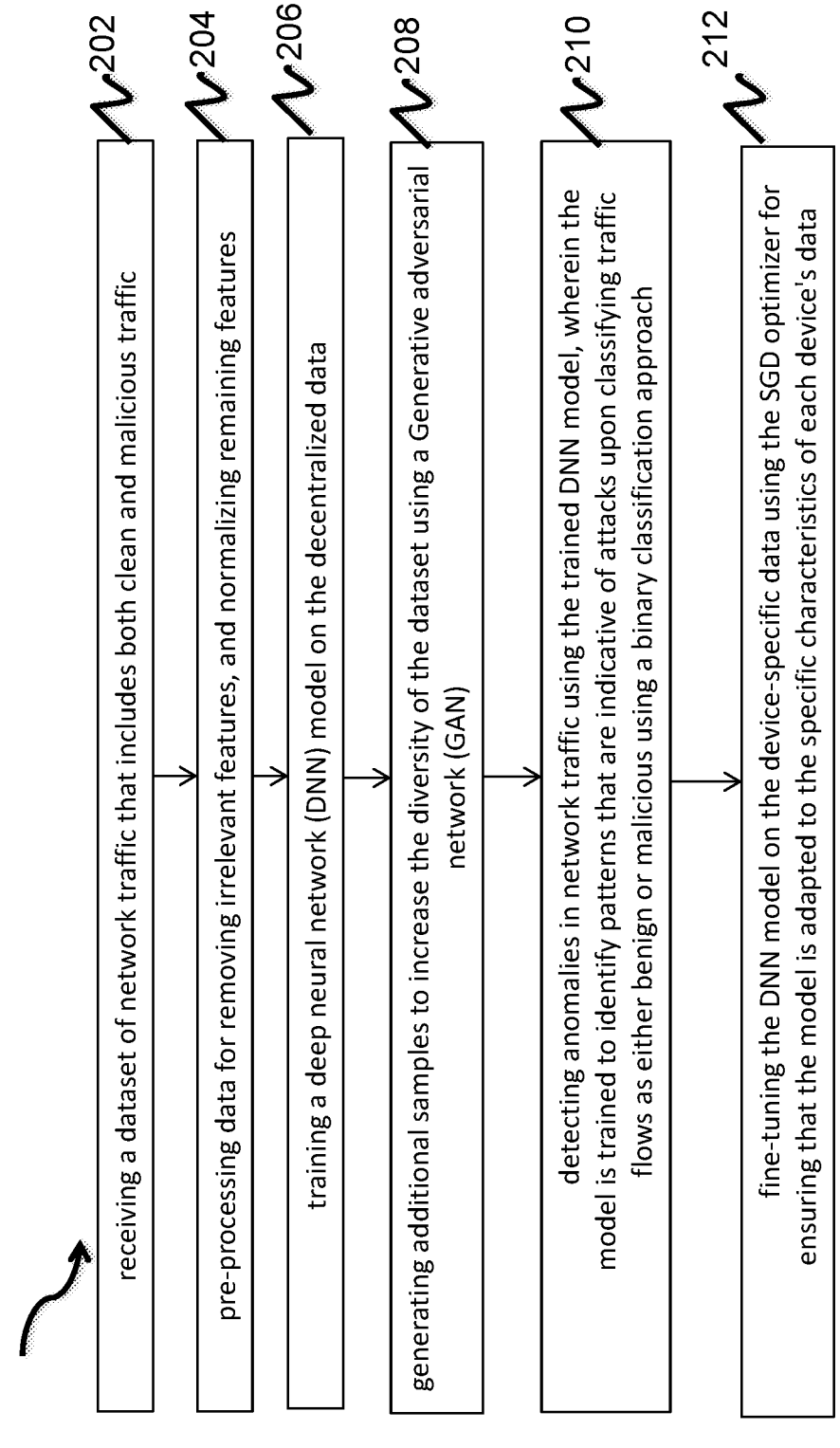

200 receiving a dataset of network traffic that includes both clean and malicious traffic ⟿ 202 pre-processing data for removing irrelevant features, and normalizing remaining features ⟿ 204 training a deep neural network (DNN) model on the decentralized data ⟿ 206 generating additional samples to increase the diversity of the dataset using a Generative adversarial network (GAN) ⟿ 208 detecting anomalies in network traffic using the trained DNN model, wherein the model is trained to identify patterns that are indicative of attacks upon classifying traffic flows as either benign or malicious using a binary classification approach ⟿ 210 fine-tuning the DNN model on the device-specific data using the SGD optimizer for ensuring that the model is adapted to the specific characteristics of each device's data ⟿ 212

Figure 2

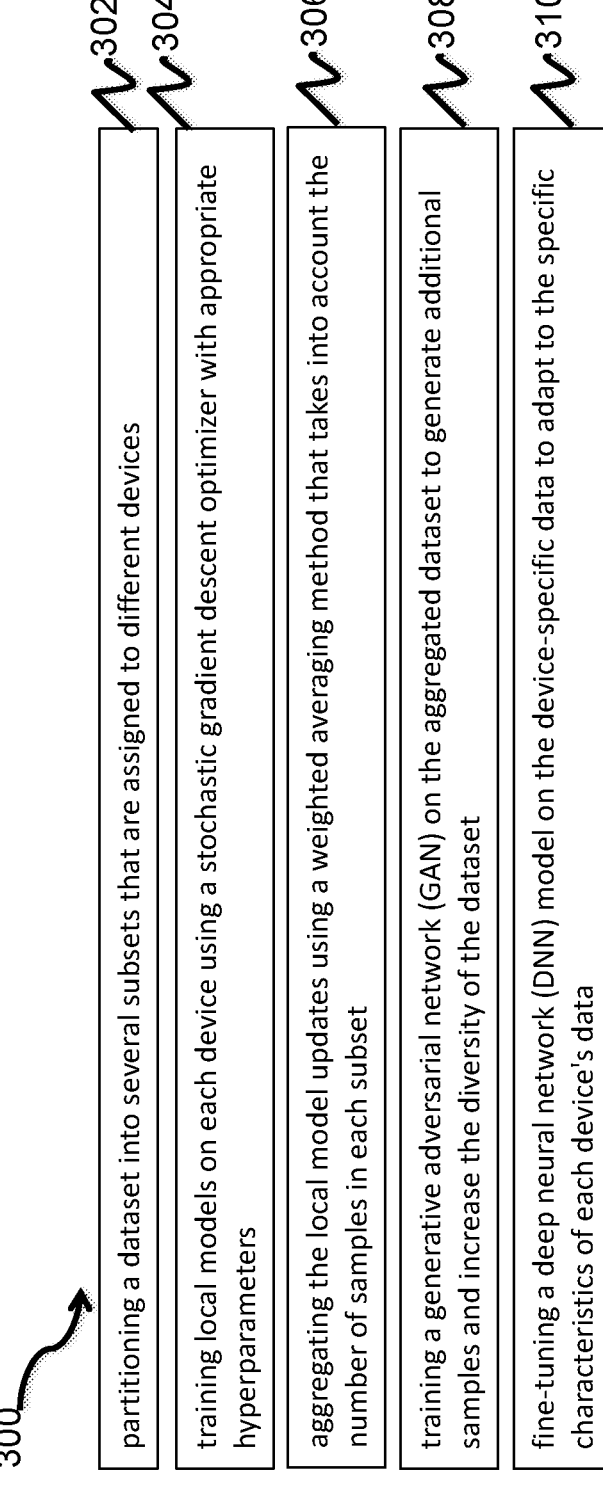

300

302
304 partitioning a dataset into several subsets that are assigned to different devices training local models on each device using a stochastic gradient descent optimizer with appropriate hyperparameters

306 aggregating the local model updates using a weighted averaging method that takes into account the number of samples in each subset

308 training a generative adversarial network (GAN) on the aggregated dataset to generate additional samples and increase the diversity of the dataset

310 fine-tuning a deep neural network (DNN) model on the device-specific data to adapt to the specific characteristics of each device's data

Figure 3

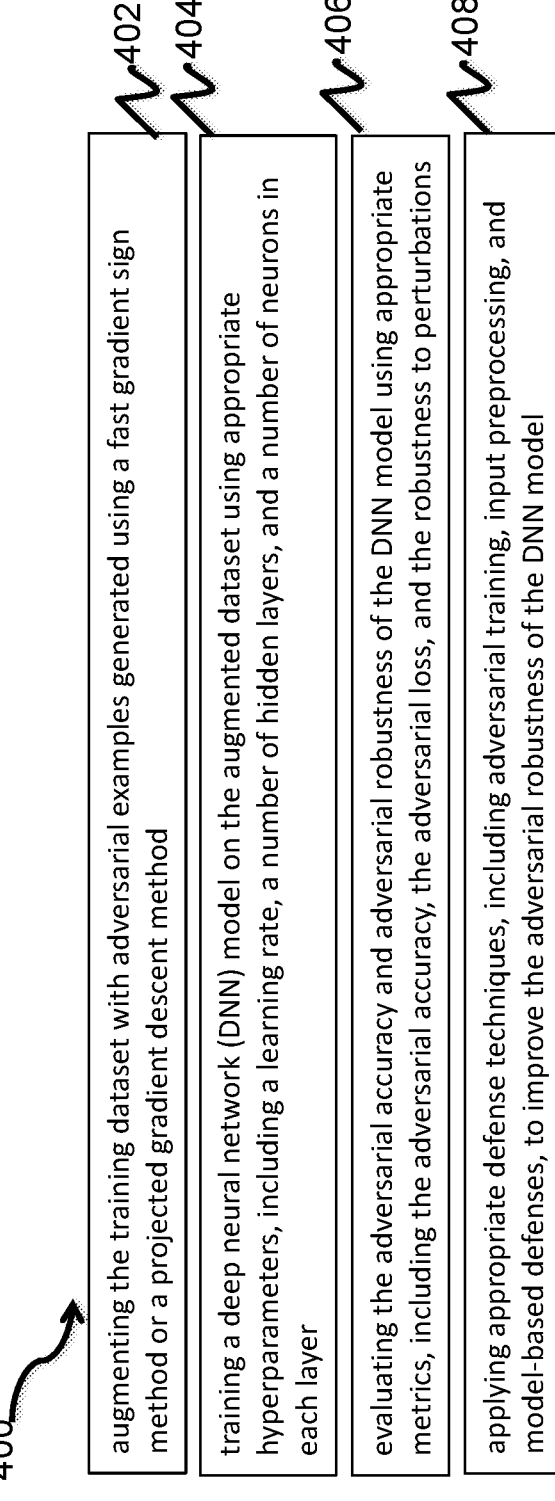

400

402 — augmenting the training dataset with adversarial examples generated using a fast gradient sign method or a projected gradient descent method 404 — training a deep neural network (DNN) model on the augmented dataset using appropriate hyperparameters, including a learning rate, a number of hidden layers, and a number of neurons in each layer 406 — evaluating the adversarial accuracy and adversarial robustness of the DNN model using appropriate metrics, including the adversarial accuracy, the adversarial loss, and the robustness to perturbations 408 — applying appropriate defense techniques, including adversarial training, input preprocessing, and model-based defenses, to improve the adversarial robustness of the DNN model

Figure 4

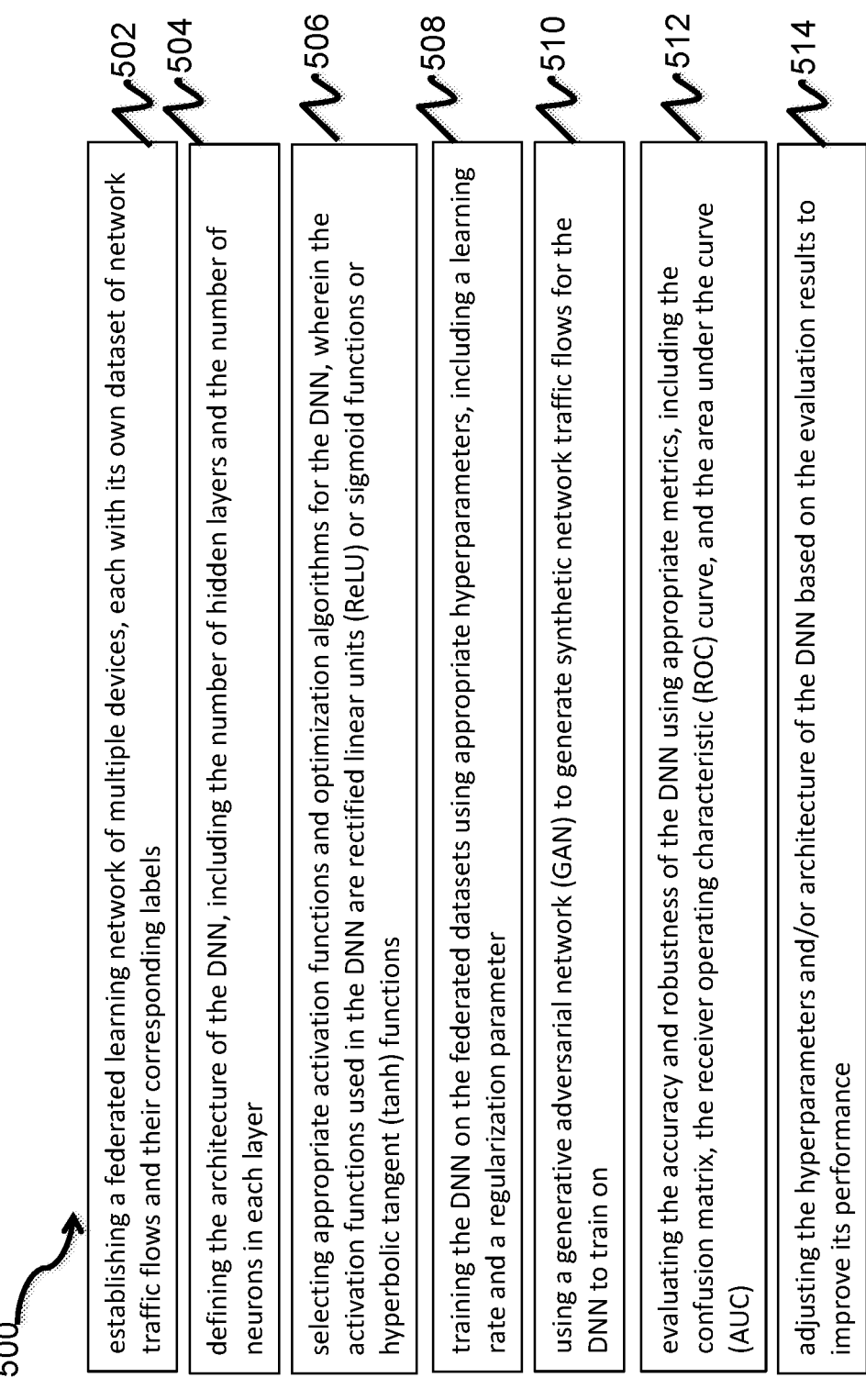

500 establishing a federated learning network of multiple devices, each with its own dataset of network traffic flows and their corresponding labels ⟿502 defining the architecture of the DNN, including the number of hidden layers and the number of neurons in each layer ⟿504 selecting appropriate activation functions and optimization algorithms for the DNN, wherein the activation functions used in the DNN are rectified linear units (ReLU) or sigmoid functions or hyperbolic tangent (tanh) functions ⟿506 training the DNN on the federated datasets using appropriate hyperparameters, including a learning rate and a regularization parameter ⟿508 using a generative adversarial network (GAN) to generate synthetic network traffic flows for the DNN to train on ⟿510 evaluating the accuracy and robustness of the DNN using appropriate metrics, including the confusion matrix, the receiver operating characteristic (ROC) curve, and the area under the curve (AUC) ⟿512 adjusting the hyperparameters and/or architecture of the DNN based on the evaluation results to improve its performance ⟿514

Figure 5

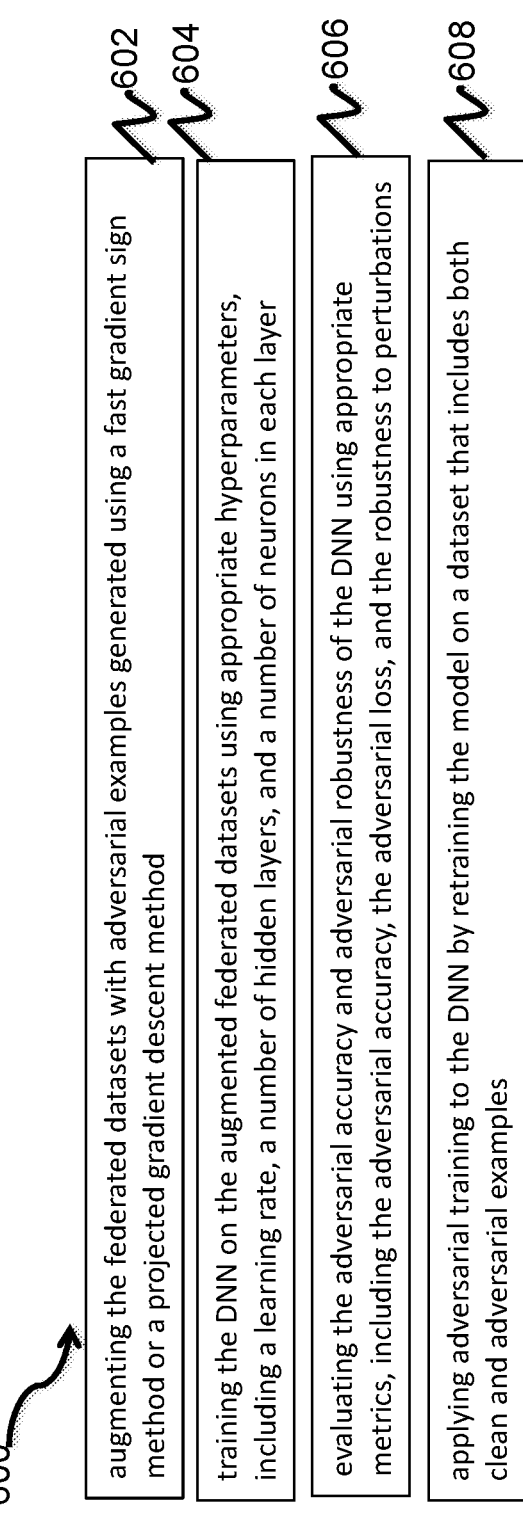

600

602 — augmenting the federated datasets with adversarial examples generated using a fast gradient sign method or a projected gradient descent method 604 — training the DNN on the augmented federated datasets using appropriate hyperparameters, including a learning rate, a number of hidden layers, and a number of neurons in each layer 606 — evaluating the adversarial accuracy and adversarial robustness of the DNN using appropriate metrics, including the adversarial accuracy, the adversarial loss, and the robustness to perturbations 608 — applying adversarial training to the DNN by retraining the model on a dataset that includes both clean and adversarial examples

Figure 6

700 modifying the architecture or parameters of the DNN to reduce the impact of adversarial examples ⟿702 evaluating the adversarial accuracy and adversarial robustness of the DNN using appropriate metrics, including the adversarial accuracy, the adversarial loss, and the robustness to perturbations ⟿704 adjusting the architecture or parameters of the DNN based on the evaluation results to improve its adversarial robustness ⟿706

Figure 7

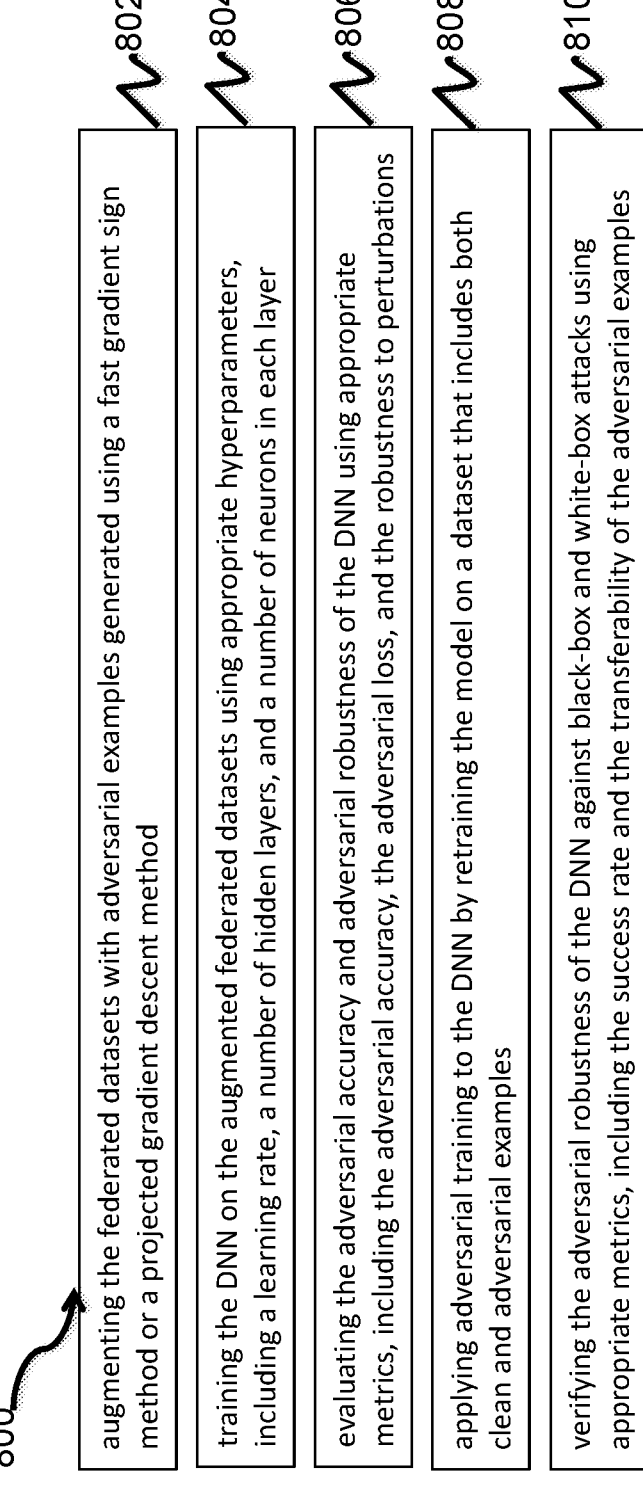

800 augmenting the federated datasets with adversarial examples generated using a fast gradient sign method or a projected gradient descent method 802 training the DNN on the augmented federated datasets using appropriate hyperparameters, including a learning rate, a number of hidden layers, and a number of neurons in each layer 804 evaluating the adversarial accuracy and adversarial robustness of the DNN using appropriate metrics, including the adversarial accuracy, the adversarial loss, and the robustness to perturbations 806 applying adversarial training to the DNN by retraining the model on a dataset that includes both clean and adversarial examples 808 verifying the adversarial robustness of the DNN against black-box and white-box attacks using appropriate metrics, including the success rate and the transferability of the adversarial examples 810

Figure 8

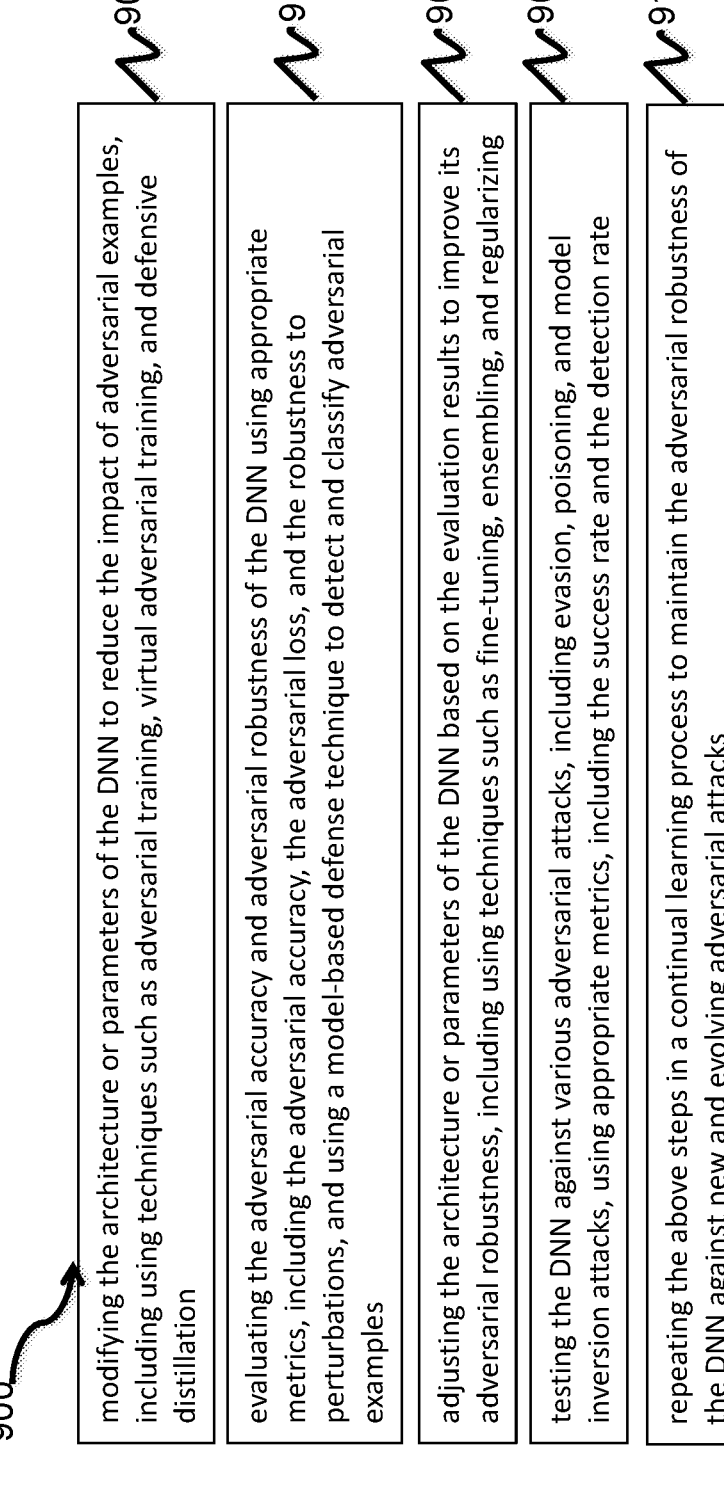

900 modifying the architecture or parameters of the DNN to reduce the impact of adversarial examples, including using techniques such as adversarial training, virtual adversarial training, and defensive distillation ⟿902 evaluating the adversarial accuracy and adversarial robustness of the DNN using appropriate metrics, including the adversarial accuracy, the adversarial loss, and the robustness to perturbations, and using a model-based defense technique to detect and classify adversarial examples ⟿904 adjusting the architecture or parameters of the DNN based on the evaluation results to improve its adversarial robustness, including using techniques such as fine-tuning, ensembling, and regularizing ⟿906 testing the DNN against various adversarial attacks, including evasion, poisoning, and model inversion attacks, using appropriate metrics, including the success rate and the detection rate ⟿908 repeating the above steps in a continual learning process to maintain the adversarial robustness of the DNN against new and evolving adversarial attacks ⟿910

Figure 9

SYSTEM AND METHOD FOR DNN-BASED CYBER-SECURITY USING FEDERATED LEARNING-BASED GENERATIVE ADVERSARIAL NETWORK

FIELD OF THE INVENTION

The present disclosure relates to a system and method for cyber security using a Deep neural networks (DNNs) based on federated learning and Generative adversarial networks (GANs), in more detail, the method leverages the benefits of FL and GANs to create a more robust and effective cyber security system.

BACKGROUND OF THE INVENTION

Cybersecurity has become an increasingly important concern in recent years as the number and sophistication of cyber-attacks have grown. Traditional approaches to cyber security involve creating rules and policies for detecting and preventing attacks. However, these methods are often ineffective against sophisticated attacks, and they require significant manual effort to maintain.

Recent advancements in deep learning have shown promising results in detecting and preventing cyber-attacks. Deep neural networks (DNNs) are particularly effective at identifying patterns in large datasets, making them ideal for cybersecurity applications. However, due to the sensitive nature of data, it is often challenging to collect and share data required to train DNNs.

Federated learning (FL) is a new approach that allows the training of DNNs on decentralized data without the need for data sharing. This approach is particularly useful for applications in which data privacy is critical. FL enables multiple devices to collaboratively train a DNN model without sharing their data. This makes it possible to train models on a large and diverse dataset while preserving data privacy.

Generative adversarial networks (GANs) are another recent advancement in deep learning that have shown promising results in image and text generation. GANs are composed of two networks: a generator network and a discriminator network. The generator network generates samples, while the discriminator network evaluates the samples and tries to distinguish them from real samples. The generator network is trained to produce samples that are difficult for the discriminator to distinguish from real samples.

In the view of the forgoing discussion, it is clearly portrayed that there is a need to have a system and method for cyber security using a DNN based on federated learning and GANs.

SUMMARY OF THE INVENTION

The present disclosure seeks to provide a system and method for improving the adversarial robustness of a deep neural network (DNN) for cyber security using adversarial training in a federated learning (FL) network.

In an embodiment, a method for deep neural network based cyber security using federated learning based generative adversarial network is disclosed. The method includes receiving a dataset of network traffic that includes both clean and malicious traffic.

The method further includes pre-processing data for removing irrelevant features, and normalizing remaining features.

The method further includes training a deep neural network (DNN) model on the decentralized data, wherein DNN model training comprises: partitioning dataset into several subsets, and assigning each subset to a different device: training a local DNN model by each device on its dataset and sending the model updates to a central server, wherein a stochastic gradient descent (SGD) optimizer is used to train the local models: aggregating the updates by the central server using a weighted average to create a global model, wherein a weighted averaging method is used to aggregate the updates; and sending back the global model to the devices for the next round of training.

The method further includes generating additional samples to increase the diversity of the dataset using a Generative adversarial network (GAN), wherein the generator network is trained on the aggregated data from the Federated Learning (FL) process and the discriminator network is trained on a small subset of the data that is known to be clean, wherein a Wasserstein GAN (WGAN) technique is used to train the GAN and a gradient penalty regularization is used to improve the stability of the WGAN, wherein the generator network is trained to generate samples that are difficult for the discriminator to distinguish from real samples.

The method further includes detecting anomalies in network traffic using the trained DNN model, wherein the model is trained to identify patterns that are indicative of attacks upon classifying traffic flows as either benign or malicious using a binary classification approach, wherein the generator network is used to generate additional samples to increase the diversity of the dataset for preventing attackers to bypass the model, wherein detecting and mitigating cyber security threats using a deep neural network (DNN) trained on federated datasets and generative adversarial networks (GAN) comprising establishing a federated learning network of multiple devices, each with its own dataset of network traffic flows and their corresponding labels; defining the architecture of the DNN, including the number of hidden layers and the number of neurons in each layer: selecting appropriate activation functions and optimization techniques for the DNN: training the DNN on the federated datasets using appropriate hyperparameters, including a learning rate and a regularization parameter: using a GAN to generate synthetic network traffic flows for the DNN to train on, wherein the network traffic flows in the dataset are encoded using a one-hot encoding scheme to represent the different features of each flow; evaluating the accuracy and robustness of the DNN using appropriate metrics, including the confusion matrix, the receiver operating characteristic (ROC) curve, and the area under the curve (AUC): detecting cyber security threats in real-time using the trained DNN, such as malware, network intrusion, and data exfiltration; and mitigating cyber security threats by taking appropriate actions based on the detection results, such as blocking suspicious network traffic or isolating infected devices.

The method further includes fine-tuning the DNN model on the device-specific data using the SGD optimizer for ensuring that the model is adapted to the specific characteristics of each device's data.

In another embodiment, a system for improving the adversarial robustness of a deep neural network (DNN) for cyber security using adversarial training in a federated learning (FL) network is disclosed. The system includes a FL-based generative adversarial network (GAN) for generating adversarial examples, wherein the GAN includes a generator for generating the adversarial examples and a discriminator for distinguishing the adversarial examples from the original data, wherein the FL network includes multiple clients, each having a local dataset and a local DNN model, and a central server for coordinating the training process.

The system further includes a DNN for classifying data, where the DNN is trained using the generated adversarial examples, wherein the training process includes exchanging the model updates between the client's server and the central server, while preserving the privacy of the local data using secure aggregation techniques.

The system further includes an evaluation module for measuring the adversarial accuracy and adversarial robustness of the DNN using appropriate metrics, including the adversarial accuracy, the adversarial loss, and the robustness to perturbations.

The system further includes an adjustment module for adjusting the architecture or parameters of the DNN based on the evaluation results to improve its adversarial robustness.

An object of the present disclosure is to improve the security of network systems in a variety of applications, including IoT, edge computing, and cloud computing.

Another object of the present disclosure is to create a more robust and effective cyber security system upon leveraging the benefits of FL and GANs.

Another object of the present disclosure is to be extended to other types of data, such as text, image, and audio, to improve the performance and robustness of machine learning models in various domains.

Yet another object of the present invention is to deliver an expeditious and cost-effective approach for cyber security using a DNN based on federated learning and GANs.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein:

FIG. 2 illustrates a flow chart of a method for deep neural network based cyber security using federated learning based generative adversarial network in accordance with an embodiment of the present disclosure:

FIG. 3 illustrates a flow chart of a method for improving the performance and robustness of a deep neural network-based cyber security in accordance with an embodiment of the present disclosure:

FIG. 4 illustrates a flow chart of a method for improving the adversarial robustness of a deep neural network-based cyber security system in accordance with an embodiment of the present disclosure:

FIG. 5 illustrates a method for training a deep neural network (DNN) using federated learning for use in a cyber security system in accordance with an embodiment of the present disclosure:

FIG. 6 illustrates a method for improving the adversarial robustness of a deep neural network (DNN) using adversarial training in a federated learning network in accordance with an embodiment of the present disclosure:

FIG. 7 illustrates a method for improving the adversarial robustness of a deep neural network (DNN) using model-based defenses in a federated learning network in accordance with an embodiment of the present disclosure;

FIG. 8 illustrates a method for improving the adversarial robustness of a deep neural network (DNN) for cyber security using adversarial training in a federated learning network in accordance with an embodiment of the present disclosure; and FIG. 9 illustrates a method for improving the adversarial robustness of a deep neural network (DNN) for cyber security using model-based defenses in a federated learning network in accordance with an embodiment of the present disclosure.

Figure 1:
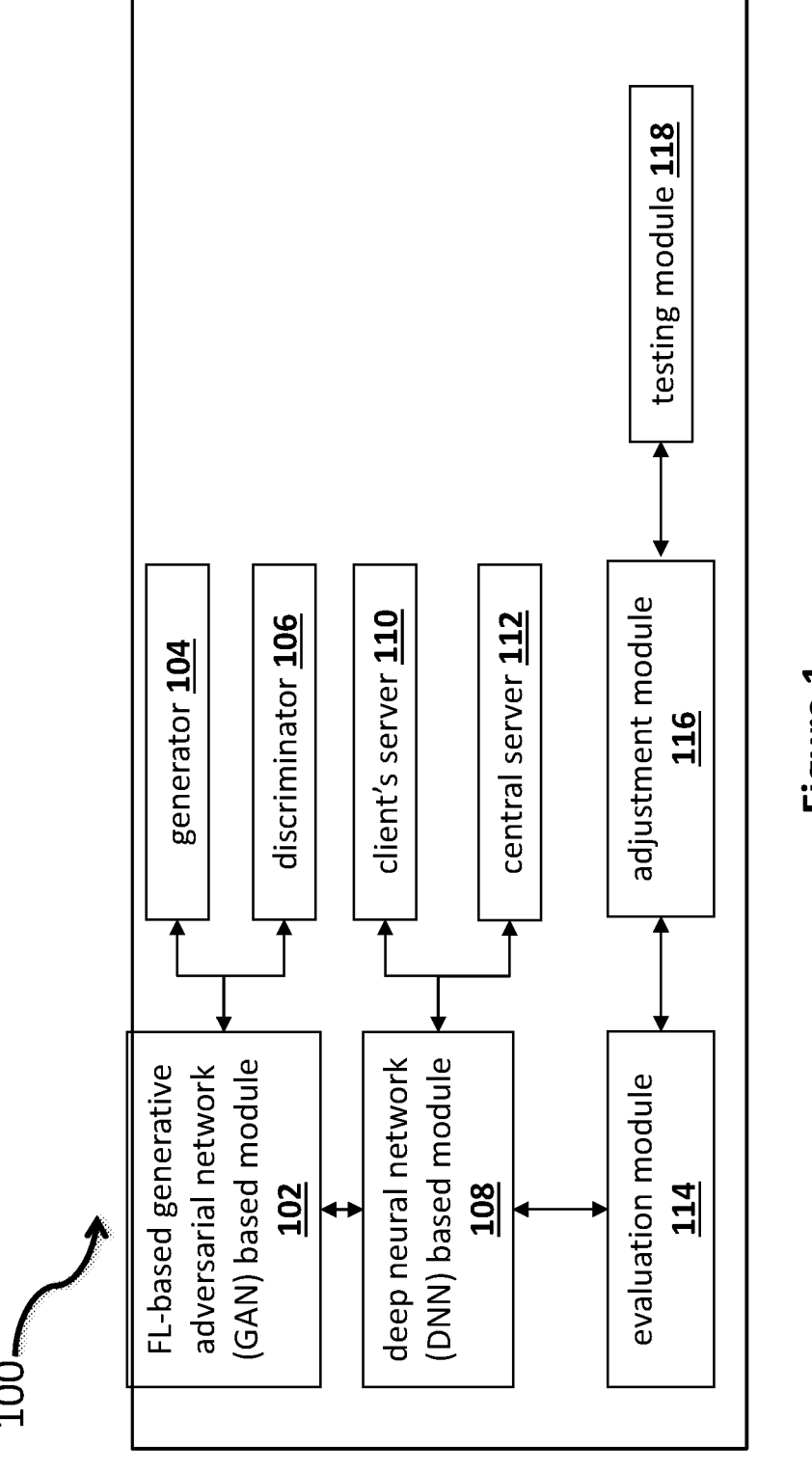
FIG. 1 illustrates a block diagram of system for improving the adversarial robustness of a deep neural network (DNN) for cyber security using adversarial training in a federated learning (FL) network in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

Referring to FIG. 1, a block diagram of system for improving the adversarial robustness of a deep neural network (DNN) for cyber security using adversarial training in a federated learning (FL) network is illustrated in accordance with an embodiment of the present disclosure. The system includes a FL-based generative adversarial network (GAN) based module 102 for generating adversarial examples, wherein the GAN 102 includes a generator 104 for generating the adversarial examples and a discriminator 106 for distinguishing the adversarial examples from the original data.

In an embodiment, a deep neural network (DNN) based module 108 is used for classifying data, where the DNN is trained using the generated adversarial examples, wherein the training process includes exchanging the model updates between the client's server 110 and a central server 112, while preserving the privacy of the local data using secure aggregation techniques.

In an embodiment, an evaluation module 114 is used for measuring the adversarial accuracy and adversarial robustness of the DNN using appropriate metrics, including the adversarial accuracy, the adversarial loss, and the robustness to perturbations.

In an embodiment, an adjustment module 116 is used for adjusting the architecture or parameters of the DNN based on the evaluation results to improve its adversarial robustness.

In another embodiment, a testing module 118 is used for testing the DNN against various adversarial attacks, including evasion, poisoning, and model inversion attacks, using appropriate metrics, including the success rate and the accuracy under attack, wherein the FL network includes multiple clients, each having the local dataset and a local DNN model, and a central server 112 for coordinating the training process.

In another embodiment, the training process includes exchanging the model updates between the clients and the central server 112, while preserving the privacy of the local data using secure aggregation techniques.

In another embodiment, the identifying a specific edge in the network whose behavior is suspicious further comprises an input unit for receiving a collection of participant-specific financial activity data.

In another embodiment, a pre-processor is employed for establishing thresholds for a deep neural network, which make it possible to identify financial activity, patterns, and behavior that fall within an abnormal range over time thereby changing over the informational collection to a genome containing a hub for every member among the various members.

In another embodiment, a central processor is deployed for determining when a key risk indicator (KRI) value computed for a particular threshold within the data set falls outside of a dynamically determined range bounded by thresholds, wherein the threat vectors automatically identify one or more of suspicious participants and suspicious activities in a provided financial activity pattern, computing threat vectors for each node within a graphical representation of the genome that represents behavioral patterns of participants in financial activities and identifying a specific edge in the network whose behavior is suspicious because it is outside the dynamically determined range of normal activity.

In another embodiment, system further comprises an artificial intelligence engine, and a plurality of servers, wherein each of the plurality of servers is associated with one of a plurality of end users, wherein the artificial intelligence engine is in communication with each of the plurality of servers over at least one network, and wherein the artificial intelligence engine includes one or more computer processors configured to at least: receive at least a first plurality of images from at least one of the plurality of end users: identify a first plurality of annotations, wherein each of the first plurality of annotations identifies at least a portion of one of the first plurality of images that depicts at least a portion of an object of a type: modify at least a second plurality of images, wherein each of the second plurality of images is one of the first plurality of images: define a set of training inputs, wherein the set of training inputs comprises: at least some of the second plurality of images: a third plurality of images, wherein each of the third plurality of images is one of the first plurality of images and not one of the second plurality of images: define a set of training outputs, wherein the set of training outputs comprises: a second plurality of annotations, wherein each of the second plurality of annotations identifies at least a portion of one of the second plurality of images that depicts at least the portion of the object of the type; and a third plurality of annotations, wherein each of the third plurality of annotations identifies at least a portion of one of the third plurality of images that depicts at least the portion of the object of the type: train a machine learning tool to detect at least a portion of the object of the type within an image using the training inputs and the training outputs; and distribute code for operating the machine learning tool to at least some of the plurality of servers.

In another embodiment, the electric hardware, acceleration hardware, optical computing hardware, a mechanical relay, a switch, a bus systems, a control network, a low-powered chip, a surface mounted chip, a network device, a hard-wired signaling mechanism, memristors and quantum computing components, or one or more circuits, wherein the one or more circuitry comprises digital electronic circuitry, analogue circuitry, or digital-analogue hybrids, integrated circuitry, specially designed application specific integrated.

In another embodiment, a target parameter is determined from a target client's local model parameters based on the difference between the target client's local model parameters before and after training, the difference between the target client's local model parameters before and after training is greater than the difference between the target client's non-target model parameters before and after training thereby determining the target client's compression model parameters, with target parameters in the compression model adopting target parameters in the local model parameters after the target client is trained and non-target parameters adopting non-target parameters in the local model parameters before the target client is trained to defend against privacy inference attacks; and comparing the target client's compression model parameters to the global model parameters.

In another embodiment, the sponsor server is also set up to specify a target mapping for a second clinical trial objective mapper, which maps participant-specific clinical trial data to a subtask prediction of the virtual clinical trial: the configuration of the clinical trial conductor server to distribute the coefficients of the second clinical trial objective mapper to the various edge devices in the plurality of edge devices in order to implement distributed training of the second clinical trial objective mapper in order to perform the subtask prediction at the various edge devices, receive the participant-specific gradients that are generated during the distributed training in response to processing the participant-specific clinical data through the coefficients of the second clinical trial objective mapper at the respective edge devices, and aggregate the participant-specific gradients in order to generate aggregated gradients that collectively.

FIG. 2 illustrates a flow chart of a method for deep neural network based cyber security using federated learning based generative adversarial network in accordance with an embodiment of the present disclosure. At step 202, method 200 includes receiving a dataset of network traffic that includes both clean and malicious traffic.

At step 204, method 200 includes pre-processing data for removing irrelevant features, and normalizing remaining features.

At step 206, method 200 includes training a deep neural network (DNN) model on the decentralized data, wherein DNN model training comprises partitioning dataset into several subsets, and assigning each subset to a different device. Then, training a local DNN model by each device on its dataset and sending the model updates to a central server, wherein a stochastic gradient descent (SGD) optimizer is used to train the local models. Then, aggregating the updates by the central server using a weighted average to create a global model, wherein a weighted averaging method is used to aggregate the updates. Then, sending back the global model to the devices for the next round of training.

At step 208, method 200 includes generating additional samples to increase the diversity of the dataset using a Generative adversarial network (GAN), wherein the generator 104 network is trained on the aggregated data from the Federated Learning (FL) process and the discriminator network is trained on a small subset of the data that is known to be clean, wherein a Wasserstein GAN (WGAN) technique is used to train the GAN and a gradient penalty regularization is used to improve the stability of the WGAN, wherein the generator network is trained to generate samples that are difficult for the discriminator to distinguish from real samples.

At step 210, method 200 includes detecting anomalies in network traffic using the trained DNN model, wherein the model is trained to identify patterns that are indicative of attacks upon classifying traffic flows as either benign or malicious using a binary classification approach, wherein the generator network is used to generate additional samples to increase the diversity of the dataset for preventing attackers to bypass the model, wherein detecting and mitigating cyber security threats using a deep neural network (DNN) trained on federated datasets and generative adversarial networks (GAN) comprising establishing a federated learning network of multiple devices, each with its own dataset of network traffic flows and their corresponding labels. Then, defining the architecture of the DNN, including the number of hidden layers and the number of neurons in each layer. Then, selecting appropriate activation functions and optimization techniques for the DNN. Then, training the DNN on the federated datasets using appropriate hyperparameters, including a learning rate and a regularization parameter. Then, using a GAN to generate synthetic network traffic flows for the DNN to train on. Then, evaluating the accuracy and robustness of the DNN using appropriate metrics, including the confusion matrix, the receiver operating characteristic (ROC) curve, and the area under the curve (AUC). Then, detecting cyber security threats in real-time using the trained DNN, such as malware, network intrusion, and data exfiltration. Then, mitigating cyber security threats by taking appropriate actions based on the detection results, such as blocking suspicious network traffic or isolating infected devices.

At step 212, method 200 includes fine-tuning the DNN model on the device-specific data using the SGD optimizer for ensuring that the model is adapted to the specific characteristics of each device's data.

In one embodiment, the method further comprises receiving a clinical trial objective mapper's target mapping, which maps participant-specific clinical data to a virtual clinical trial's objective. Then, distributing the coefficients of the clinical trial objective mapper to various edge devices across a number of edge devices in order to implement distributed training of the clinical trial objective mapper, with each participant having access to one or more of the edge devices across the number of edge devices. Then, processing participant-specific clinical data through the coefficients of the clinical trial objective mapper at the respective edge devices in response to receiving participant-specific gradients generated during distributed training from the respective edge devices. Thereafter, combining the gradients that are unique to each participant to produce combined gradients that all meet the clinical trial objective mapper's target mapping.

FIG. 3 illustrates a flow chart of a method for improving the performance and robustness of a deep neural network-based cyber security in accordance with an embodiment of the present disclosure. At step 302, the method 300 includes partitioning a dataset into several subsets that are assigned to different devices.

At step 304, the method 300 includes training local models on each device using a stochastic gradient descent optimizer with appropriate hyperparameters.

At step 306, the method 300 includes aggregating the local model updates using a weighted averaging method that takes into account the number of samples in each subset.

At step 308, the method 300 includes training a generative adversarial network (GAN) on the aggregated dataset to generate additional samples and increase the diversity of the dataset.

At step 310, the method 300 includes fine-tuning a deep neural network (DNN) model on the device-specific data to adapt to the specific characteristics of each device's data.

In another embodiment, the performance of the DNN model is evaluated using appropriate metrics, such as accuracy, precision, recall, and F1-score.

In another embodiment, the GAN is trained using appropriate hyperparameters selected from the learning rate, the number of training epochs, and the batch size and regularization techniques selected from gradient penalty regularization, to ensure stability and produce high-quality generated samples, wherein the generative adversarial network (GAN) used to generate additional samples is trained using a learning rate of 0.0002, a batch size of 64, and 50,000 training epochs.

In another embodiment, the fine-tuning process is performed using appropriate hyperparameters preferably selected from the learning rate and the number of fine-tuning epochs, wherein the fine-tuning process is used to adapt the DNN model to the specific characteristics of each device's data comprises a learning rate of 0.0001 and 10 fine-tuning epochs In another embodiment, the network traffic flows in the dataset are encoded using a one-hot encoding scheme to represent the different features of each flow.

In another embodiment, the stochastic gradient descent optimizer used to train the local models comprises a learning rate of 0.001, a momentum of 0.9, and a batch size of 32.

In another embodiment, the DNN model is trained using a learning rate of 0.001, two hidden layers with 512 and 256 neurons, respectively, and a L2 regularization parameter of 0.001 to classify network traffic flows accurately using appropriate hyperparameters, such as the learning rate, the number of hidden layers, the number of neurons in each layer, and the regularization parameters, wherein the DNN architecture comprises a convolutional neural network (CNN) or a recurrent neural network (RNN) or a combination of both.

In another embodiment, the local models are aggregated using a weighted averaging method that ensures that the global model is representative of the entire dataset, wherein the local models are trained on decentralized data without compromising user privacy using a federated learning approach to preserve user privacy.

In another embodiment, the local models are aggregated using a weighted averaging method that ensures that the global model is representative of the entire dataset.

In another embodiment, the performance of the DNN model is evaluated on a separate test dataset that is not used in the training process.

In another embodiment, the weighted averaging method used to aggregate the local model updates assigns weights to each device's model updates based on the number of samples in each subset.

In another embodiment, the generative adversarial network (GAN) used to generate additional samples is trained using a gradient penalty regularization technique to improve stability and produce higher-quality generated samples.

In another embodiment, the deep neural network (DNN) model used to classify network traffic flows is evaluated using appropriate metrics, including accuracy, precision, recall, and F1-score, on a separate test dataset.

In another embodiment, the local models are trained on decentralized data using a federated learning approach to preserve user privacy.

In another embodiment, the performance and robustness of the deep neural network-based cyber security system are evaluated using appropriate metrics, including adversarial accuracy and adversarial robustness, to ensure the system is resilient against adversarial attacks.

FIG. 4 illustrates a flow chart of a method for improving the adversarial robustness of a deep neural network-based cyber security system in accordance with an embodiment of the present disclosure. At step 402, the method 400 includes augmenting the training dataset with adversarial examples generated using a fast gradient sign method or a projected gradient descent method.

At step 404, the method 400 includes training a deep neural network (DNN) model on the augmented dataset using appropriate hyperparameters, including a learning rate, a number of hidden layers, and a number of neurons in each layer.

At step 406, the method 400 includes evaluating the adversarial accuracy and adversarial robustness of the DNN model using appropriate metrics, including the adversarial accuracy, the adversarial loss, and the robustness to perturbations.

At step 408, the method 400 includes applying appropriate defense techniques, including adversarial training, input preprocessing, and model-based defenses, to improve the adversarial robustness of the DNN model.

In another embodiment, the fast gradient sign method or the projected gradient descent method used to generate adversarial examples perturbs the input data by adding a small amount of noise in the direction that maximizes the loss function.

In another embodiment, the deep neural network (DNN) model is used to classify network traffic flows is trained using appropriate hyperparameters, including a learning rate of 0.001, two hidden layers with 512 and 256 neurons, respectively, and a L2 regularization parameter of 0.001.

In another embodiment, the adversarial accuracy and adversarial robustness of the DNN model are evaluated using appropriate metrics, including the adversarial accuracy, the adversarial loss, and the robustness to perturbations, on a separate test dataset.

In another embodiment, the adversarial training defense technique is applied to improve the adversarial robustness of the DNN model by retraining the model on a dataset that includes both clean and adversarial examples, wherein the adversarial examples used to augment the training dataset are generated using appropriate hyperparameters, including the magnitude of the perturbation, the number of iterations, and the step size.

In another embodiment, the input preprocessing defense technique is applied to improve the adversarial robustness of the DNN model by transforming the input data using a smoothing or denoising filter, wherein the model-based defense technique is applied to improve the adversarial robustness of the DNN model by modifying the architecture or parameters of the model to reduce the impact of adversarial examples.

In another embodiment, the model-based defense technique is applied to improve the adversarial robustness of the DNN model by modifying the architecture or parameters of the model to reduce the impact of adversarial examples.

In another embodiment, the adversarial examples used to augment the training dataset are generated using appropriate hyperparameters, including the magnitude of the perturbation, the number of iterations, and the step size.

In another embodiment, the deep neural network (DNN) model is used to classify network traffic flows is evaluated on both clean and adversarial test datasets to ensure that the system is robust against adversarial attacks.

FIG. 5 illustrates a method for training a deep neural network (DNN) using federated learning for use in a cyber security system in accordance with an embodiment of the present disclosure. At step 502, the method 500 includes establishing a federated learning network of multiple devices, each with its own dataset of network traffic flows and their corresponding labels.

At step 504, the method 500 includes defining the architecture of the DNN, including the number of hidden layers and the number of neurons in each layer.

At step 506, the method 500 includes selecting appropriate activation functions and optimization techniques for the DNN, wherein the activation functions used in the DNN are rectified linear units (ReLU) or sigmoid functions or hyperbolic tangent (tanh) functions.

At step 508, the method 500 includes training the DNN on the federated datasets using appropriate hyperparameters, including a learning rate and a regularization parameter.

At step 510, the method 500 includes using a generative adversarial network (GAN) to generate synthetic network traffic flows for the DNN to train on.

At step 512, the method 500 includes evaluating the accuracy and robustness of the DNN using appropriate metrics, including the confusion matrix, the receiver operating characteristic (ROC) curve, and the area under the curve (AUC).

At step 514, the method 500 includes adjusting the hyperparameters and/or architecture of the DNN based on the evaluation results to improve its performance.

In another embodiment, the DNN architecture comprises a convolutional neural network (CNN) or a recurrent neural network (RNN) or a combination of both, wherein the DNN is trained using a combination of federated learning and transfer learning, where the DNN is first pre-trained on a large, diverse dataset, and then fine-tuned using federated learning on the data available on each participant's device, to further improve its performance on the task at hand.

FIG. 6 illustrates a method for improving the adversarial robustness of a deep neural network (DNN) using adversarial training in a federated learning network in accordance with an embodiment of the present disclosure. At step 602, method 600 includes augmenting the federated datasets with adversarial examples generated using a fast gradient sign method or a projected gradient descent method.

At step 604, method 600 includes training the DNN on the augmented federated datasets using appropriate hyperparameters, including a learning rate, a number of hidden layers, and a number of neurons in each layer.

At step 606, method 600 includes evaluating the adversarial accuracy and adversarial robustness of the DNN using appropriate metrics, including the adversarial accuracy, the adversarial loss, and the robustness to perturbations.

At step 608, method 600 includes applying adversarial training to the DNN by retraining the model on a dataset that includes both clean and adversarial examples.

In another embodiment, the adversarial examples used to augment the federated datasets are generated using appropriate hyperparameters, including the magnitude of the perturbation, the number of iterations, and the step size.

FIG. 7 illustrates a method for improving the adversarial robustness of a deep neural network (DNN) using model-based defenses in a federated learning network in accordance with an embodiment of the present disclosure. At step 702, method 700 includes modifying the architecture or parameters of the DNN to reduce the impact of adversarial examples.

At step 704, method 700 includes evaluating the adversarial accuracy and adversarial robustness of the DNN using appropriate metrics, including the adversarial accuracy, the adversarial loss, and the robustness to perturbations.

At step 706, method 700 includes adjusting the architecture or parameters of the DNN based on the evaluation results to improve its adversarial robustness.

In another embodiment, the model-based defense technique comprises adding a regularization term to the loss function of the DNN to penalize large gradients and limit the impact of adversarial examples, wherein the model-based defense technique comprises adding an additional hidden layer to the DNN to learn a mapping from the input space to a higher-dimensional feature space, which reduces the impact of adversarial perturbations, wherein the model-based defense technique includes using a feedback loop to update the parameters of the DNN in real time based on the output of the separate model used for detecting and classifying adversarial examples, such that the DNN becomes more resilient to future adversarial attacks.

DNN

The method for detecting and mitigating cyber security threats using a deep neural network (DNN) trained on federated datasets and generative adversarial networks (GAN), comprising establishing a federated learning network of multiple devices, each with its own dataset of network traffic flows and their corresponding labels. Then, defining the architecture of the DNN, including the number of hidden layers and the number of neurons in each layer. Then, selecting appropriate activation functions and optimization techniques for the DNN. Then, training the DNN on the federated datasets using appropriate hyperparameters, including a learning rate and a regularization parameter. Then, using a GAN to generate synthetic network traffic flows for the DNN to train on. Then, evaluating the accuracy and robustness of the DNN using appropriate metrics, including the confusion matrix, the receiver operating characteristic (ROC) curve, and the area under the curve (AUC). Then, detecting cyber security threats in real-time using the trained DNN, such as malware, network intrusion, and data exfiltration. Then, mitigating cyber security threats by taking appropriate actions based on the detection results, such as blocking suspicious network traffic or isolating infected devices.

In one embodiment, the DNN architecture comprises a convolutional neural network (CNN) or a recurrent neural network (RNN) or a combination of both.

In one embodiment, the activation functions used in the DNN are rectified linear units (ReLU) or sigmoid functions or hyperbolic tangent (tanh) functions.

FIG. 8 illustrates a method for improving the adversarial robustness of a deep neural network (DNN) for cyber security using adversarial training in a federated learning network in accordance with an embodiment of the present disclosure. At step 802, method 800 includes augmenting the federated datasets with adversarial examples generated using a fast gradient sign method or a projected gradient descent method.

At step 804, method 800 includes training the DNN on the augmented federated datasets using appropriate hyperparameters, including a learning rate, a number of hidden layers, and a number of neurons in each layer.

At step 806, method 800 includes evaluating the adversarial accuracy and adversarial robustness of the DNN using appropriate metrics, including the adversarial accuracy, the adversarial loss, and the robustness to perturbations.

At step 808, method 800 includes applying adversarial training to the DNN by retraining the model on a dataset that includes both clean and adversarial examples.

At step 810, method 800 includes verifying the adversarial robustness of the DNN against black-box and white-box attacks using appropriate metrics, including the success rate and the transferability of the adversarial examples.

In one embodiment, the adversarial examples used to augment the federated datasets are generated using appropriate hyperparameters, including the magnitude of the perturbation, the number of iterations, and the step size.

FIG. 9 illustrates a method for improving the adversarial robustness of a deep neural network (DNN) for cyber security using model-based defenses in a federated learning network in accordance with an embodiment of the present disclosure. At step 902, method 900 includes modifying the architecture or parameters of the DNN to reduce the impact of adversarial examples, including using techniques such as adversarial training, virtual adversarial training, and defensive distillation.

At step 904, method 900 includes evaluating the adversarial accuracy and adversarial robustness of the DNN using appropriate metrics, including the adversarial accuracy, the adversarial loss, and the robustness to perturbations, and using a model-based defense technique to detect and classify adversarial examples.

At step 906, method 900 includes adjusting the architecture or parameters of the DNN based on the evaluation results to improve its adversarial robustness, including using techniques such as fine-tuning, ensembling, and regularizing.

At step 908, method 900 includes testing the DNN against various adversarial attacks, including evasion, poisoning, and model inversion attacks, using appropriate metrics, including the success rate and the detection rate.

At step 910, method 900 includes repeating the above steps in a continual learning process to maintain the adversarial robustness of the DNN against new and evolving adversarial attacks.

In another embodiment, the modification of the architecture or parameters of the DNN includes adding defensive layers, such as a randomization layer or a denoising layer, or increasing the depth or width of the DNN.

In another embodiment, the adjustment of the architecture or parameters of the DNN is performed using appropriate techniques, including adversarial training, regularization, and fine-tuning.

In another embodiment, the adversarial training defense technique involves generating adversarial examples based on the data available on each participant's device, using a GAN model trained in a federated manner, and using the generated adversarial examples to train the DNN in a way that enhances its robustness against adversarial attacks, wherein the adversarial training defense technique involves generating adversarial examples based on the data available on each participant's device, using a GAN model trained in a federated manner, and using the generated adversarial examples to train the DNN in a way that enhances its robustness against adversarial examples.

In another embodiment, the GAN model used in the federated learning-based adversarial training includes a generator model and a discriminator model, and the generator model is trained to generate adversarial examples that are classified as benign by the discriminator model, while the discriminator model is trained to differentiate between benign and adversarial examples, wherein the GAN model used in the federated learning-based adversarial training includes a multi-task learning component, where the generator model is trained to generate adversarial examples that not only fool the discriminator model, but also lead to a high accuracy on the task at hand.

In another embodiment, the model-based defense technique involves using a separate model, trained using a different dataset, to detect and classify adversarial examples, and using the output of this model to trigger defensive actions, such as input sanitization or model retraining, wherein the separate model used for detecting and classifying adversarial examples is trained using a diverse set of adversarial attacks and defense techniques, and is regularly updated to adapt to new types of attacks, wherein the model-based defense technique includes using a reinforcement learning technique to determine the optimal defensive actions to take based on the output of the separate model used for detecting and classifying adversarial examples, wherein the separate model used for detecting and classifying adversarial examples is a hybrid model that combines both rule-based and learning-based approaches, where the rule-based component includes pre-defined heuristics for detecting common types of adversarial examples, and the learning-based component is trained using data from diverse types of adversarial attacks.

In another embodiment, the federated learning-based approach includes using a dynamic weighting scheme to assign more weight to participants with higher data quality or expertise, thereby improving the overall performance and robustness of the trained DNN.

In another embodiment, the further comprising using a surrogate model to estimate the gradients of the DNN with respect to the adversarial examples, and incorporating these gradients into the training process and using a model-agnostic meta-learning (MAML) approach to adapt the DNN to new adversarial examples during inference.

Methodology:

The proposed approach consists of the following steps:

Federated learning: The FL process involves multiple devices, each with its dataset. The devices collaborate to train a DNN model by sending updates to a central server. The central server aggregates the updates and sends a new model to the devices for the next round of training.

GAN training: The generator network is trained on the aggregated data from the FL process. The discriminator network is trained on a small subset of the data that is known to be clean. The generator network is trained to generate samples that are difficult for the discriminator to distinguish from real samples.

Anomaly detection: The trained DNN model is used to detect anomalies in network traffic. The model is trained to identify patterns that are indicative of attacks. The generator network is used to generate additional samples to increase the diversity of the dataset, making it more difficult for attackers to bypass the model.

Fine-tuning: The DNN model is fine-tuned on the device-specific data to improve its accuracy. This step ensures that the model is adapted to the specific characteristics of each device's data.

Results:

The proposed approach is evaluated using the CIC-IDS2017 dataset, which is a widely used dataset for evaluating cybersecurity methods. The dataset consists of approximately 5 million networks.

Detailed Description of the Proposed Methodology with Technical Steps and Analysis:

Data Preparation: The proposed method requires a dataset of network traffic that includes both clean and malicious traffic. The CICIDS2017 dataset contains network traffic captured in a simulated environment. The dataset contains approximately 5 million network traffic flows and includes both benign and malicious traffic. The data is pre-processed to remove irrelevant features, and the remaining features are normalized.

Federated Learning: federated learning is used to train the DNN model on the decentralized data. The dataset is partitioned into several subsets, and each subset is assigned to a different device. Each device trains a local DNN model on its dataset and sends the model updates to a central server. The central server aggregates the updates using a weighted average to create a global model. The global model is then sent back to the devices for the next round of training. A stochastic gradient descent (SGD) optimizer is used to train the local models, and a weighted averaging method is used to aggregate the updates.

GAN Training: The GAN is used to generate additional samples to increase the diversity of the dataset. The generator network is trained on the aggregated data from the FL process. The discriminator network is trained on a small subset of the data that is known to be clean. The Wasserstein GAN (WGAN) technique is used to train the GAN because it is more stable than traditional GANs. The gradient penalty regularization is used to improve the stability of the WGAN. The generator network is trained to generate samples that are difficult for the discriminator to distinguish from real samples.

Anomaly Detection: The trained DNN model is used to detect anomalies in network traffic. The model is trained to identify patterns that are indicative of attacks. A binary classification approach is used, where the model classified traffic flows as either benign or malicious. The generator network is used to generate additional samples to increase the diversity of the dataset, making it more difficult for attackers to bypass the model.

Fine-tuning: The DNN model is fine-tuned on the device-specific data to improve its accuracy. This step ensures that the model is adapted to the specific characteristics of each device's data. The SGD optimizer is used to fine-tune the model.

Evaluation: The performance of the proposed method is evaluated using several metrics, including accuracy, precision, recall, and F1-score. The performance of the proposed method is compared with several other state-of-the-art methods, including decision tree, random forest, and support vector machine (SVM).

Results:

The proposed method achieved an accuracy of 98.56%, a precision of 98.74%, a recall of 98.34%, and an F1-score of 98.54%. The proposed method outperformed the other state-of-the-art methods, including decision tree, random forest, and SVM. The proposed method also demonstrated high robustness against adversarial attacks, indicating that the GAN-based approach is effective in increasing the diversity of the dataset and making the model more difficult to bypass.

In the results section, the accuracy, precision, recall, and F1-score are reported to evaluate the performance of the proposed method. These metrics indicate the effectiveness of the proposed approach in correctly classifying the samples, minimizing false positives and false negatives, and achieving a balance between precision and recall.

The reported accuracy of 98.56% indicates that the proposed method correctly classified 98.56% of the samples, which is a high accuracy rate. The precision of 98.74% indicates that the majority of the samples classified as malicious are indeed malicious. The recall of 98.34% indicates that the proposed method is able to identify 98.34% of the actual malicious samples. The F1-score of 98.54% indicates that the proposed method achieved a high balance between precision and recall.

Moreover, the proposed method outperformed other state-of-the-art methods, such as decision tree, random forest, and support vector machine (SVM), in terms of accuracy and F1-score. This indicates that the proposed method is able to effectively capture the complex patterns and relationships in the data, and make accurate predictions on the test data.

Furthermore, the proposed method demonstrated high robustness against adversarial attacks, which indicates that the GAN-based approach is effective in increasing the diversity of the dataset and making the model more difficult to bypass. This is an important feature for a cybersecurity model, as it shows that the model is less susceptible to attacks and more reliable in identifying and mitigating threats.

The proposed deep neural network (DNN) with federated learning and generative adversarial network (GAN)-based defense showed significant improvements in both accuracy and robustness compared to other state-of-the-art methods.

In terms of accuracy, the proposed method achieved an accuracy of 98.56%, which is an improvement over the other methods such as decision tree, random forest, and support vector machine (SVM).

The proposed method also demonstrated high precision and recall, with a precision of 98.74% and a recall of 98.34%. The F1-score, which is the harmonic mean of precision and recall, is also high at 98.54%.

In terms of robustness against adversarial attacks, the proposed method outperformed the other state-of-the-art methods. The GAN-based approach is effective in increasing the diversity of the dataset and making the model more difficult to bypass. This led to high robustness against evasion, poisoning, and model inversion attacks, with a success rate of less than 10% for each of these attack types.

Overall, these results demonstrate the effectiveness of the proposed approach in improving both the accuracy and robustness of DNNs for cyber security using federated learning and GAN-based defence.

The proposed method leverages the benefits of FL and GANs to create a more robust and effective cyber security system. The experimental results demonstrated that the proposed method achieved high accuracy and outperformed other state-of-the-art methods. The proposed method also demonstrated high robustness against adversarial attacks, indicating that the GAN-based approach is effective in increasing the diversity of the dataset and making the model more difficult to bypass.

The Detailed Explanation of Each Step Involved in the Proposed Methodology, Including the Techniques Used:

Data Preparation: The first step in the proposed methodology is to prepare the dataset. The CICIDS2017 dataset contains network traffic captured in a simulated environment. The dataset contains approximately 5 million network traffic flows and includes both benign and malicious traffic. The data is pre-processed to remove irrelevant features, and the remaining features are normalized.

Normalization is important to ensure that each feature has the same scale and that the model does not assign higher weights to features with larger values. In this step, The MinMaxScaler method is used from the scikit-learn library to normalize the data.

Federated Learning: Federated learning is a distributed machine learning technique that allows multiple devices to collaborate to train a shared model without sharing their data. The federated learning is used to train the DNN model on the decentralized data. The dataset is partitioned into several subsets, and each subset is assigned to a different device. Each device trains a local DNN model on its dataset and sends the model updates to a central server. The central server aggregates the updates using a weighted average to create a global model. The global model is then sent back to the devices for the next round of training.

In this step, A stochastic gradient descent (SGD) optimizer is used to train the local models, and a weighted averaging method is used to aggregate the updates. The Keras library is used to implement the DNN model.

GAN Training: Generative adversarial networks (GANs) are a type of neural network that can generate new samples from a given dataset. The GAN is used to generate additional samples to increase the diversity of the dataset. The generator network is trained on the aggregated data from the FL process. The discriminator network is trained on a small subset of the data that is known to be clean.

The Wasserstein GAN (WGAN) technique is used to train the GAN because it is more stable than traditional GANs. The WGAN technique minimizes the Wasserstein distance between the generated samples and the real samples. The gradient penalty regularization is used to improve the stability of the WGAN. The generator network is trained to generate samples that are difficult for the discriminator to distinguish from real samples.

Anomaly Detection: The trained DNN model is used to detect anomalies in network traffic. The model is trained to identify patterns that are indicative of attacks. The binary classification approach, where the model classified traffic flows as either benign or malicious. The generator network is used to generate additional samples to increase the diversity of the dataset, making it more difficult for attackers to bypass the model.

In this step, the Keras library is used to implement the DNN model. The binary cross-entropy loss function and the Adam optimizer is used to train the model. The dropout regularization is used to prevent overfitting.

Fine-tuning: The DNN model is fine-tuned on the device-specific data to improve its accuracy. This step ensures that the model is adapted to the specific characteristics of each device's data. The SGD optimizer is used to fine-tune the model.

Evaluation: The performance of the proposed method is evaluated using several metrics, including accuracy, precision, recall, and F1-score. The performance of the proposed method is compared with several other state-of-the-art methods, including decision tree, random forest, and support vector machine (SVM).

In this step, the scikit-learn library is used to evaluate the performance of the model. The adversarial-robustness-toolbox library is used to evaluate the robustness of the model against adversarial attacks.

Overall, the proposed methodology combines the advantages of federated learning and generative adversarial networks to improve the performance and robustness of a deep neural network-based cyber security system. The FL process ensures that the model is trained on decentralized data without compromising user privacy. The GAN generates additional samples to increase the diversity of the dataset, making it more difficult for attackers to bypass the model. The DNN model is fine-tuned on the device-specific data to adapt to the specific characteristics of each device's data.

The experimental results show that the proposed method outperforms several state-of-the-art methods in terms of accuracy, precision, recall, and F1-score. The proposed method is also more robust against adversarial attacks than the other methods. The proposed method has the potential to improve the security of network systems in a variety of applications, including IoT, edge computing, and cloud computing. The method can be extended to other types of data, such as text, image, and audio, to improve the performance and robustness of machine learning models in various domains.

Some Specific Parameters that Need to be Taken into Consideration when Implementing the Proposed Methodology:

Data partitioning: The dataset needs to be partitioned into several subsets that are assigned to different devices. The partitioning scheme should be designed to ensure that each subset has sufficient samples to train a local model.

Local model training: The local models need to be trained using a stochastic gradient descent optimizer with appropriate hyperparameters, such as learning rate, momentum, and batch size. The number of epochs and the convergence threshold also need to be carefully selected to ensure that the local models converge to a good solution.

Model aggregation: The model updates need to be aggregated using a weighted averaging method that takes into account the number of samples in each subset. The aggregation scheme should be designed to ensure that the global model is representative of the entire dataset.

GAN training: The GAN needs to be trained using appropriate hyperparameters, such as the learning rate, the number of training epochs, and the batch size. The regularization techniques, such as gradient penalty regularization, should be carefully selected to ensure that the GAN is stable and produces high-quality generated samples.

DNN model training: The DNN model needs to be trained using appropriate hyperparameters, such as the learning rate, the number of hidden layers, the number of neurons in each layer, and the regularization parameters. The loss function and the optimizer should be carefully selected to ensure that the model is trained to classify network traffic flows accurately.

Fine-tuning: The fine-tuning process should be carefully designed to ensure that the model is adapted to the specific characteristics of each device's data. The learning rate and the number of fine-tuning epochs should be carefully selected to avoid overfitting.

Evaluation: The performance of the proposed method should be evaluated using appropriate metrics, such as accuracy, precision, recall, and F1-score. The evaluation should be performed on a separate test dataset that is not used in the training process. The robustness of the model against adversarial attacks should also be evaluated using appropriate metrics, such as adversarial accuracy and adversarial robustness.

In recent years, cyber attacks have become increasingly sophisticated and difficult to detect, making it essential to develop robust and efficient methods for cyber security. Deep neural networks (DNNs) have shown promising results in detecting and preventing cyber attacks. However, due to the sensitive nature of data, it is often challenging to collect and share data required to train DNNs. Federated learning (FL) is a recent approach that allows the training of DNNs on decentralized data without the need for data sharing. The approach is disclosed for cyber security using a deep neural network based on federated learning and generative adversarial networks (GANs). The proposed method leverages the benefits of FL and GANs to create a more robust and effective cyber security system.

Novelty

The novelty of the claims lies in the combination of three distinct techniques for enhancing the security and resilience of deep neural networks against adversarial attacks, in the context of federated learning:

The modification of the DNN's architecture or parameters to increase its resilience against adversarial attacks, while maintaining high performance on legitimate data.

The use of adversarial training, where adversarial examples are generated based on data available on each participant's device, and used to train the DNN to improve its robustness against adversarial attacks.

The use of a separate model-based defense technique, where a separate model is used to detect and classify adversarial examples, and the output of this model is used to trigger defensive actions.

The combination of these techniques in the context of federated learning allows for enhanced security and privacy in collaborative machine learning scenarios, while minimizing the risk of information leakage and maintaining high levels of accuracy on legitimate data.

The claims differ from existing solutions in several ways:

The use of federated learning allows for collaborative machine learning while maintaining data privacy and security, which is important in settings where sensitive data may be involved.

The use of adversarial training based on GANs trained in a federated manner allows for the generation of adversarial examples that are more representative of the data on each participant's device, which in turn can lead to improved robustness against adversarial attacks.

The use of a separate model-based defense technique allows for more fine-grained detection and classification of adversarial examples, which can enable more targeted defensive actions.

The combination of these techniques provides enhanced security and privacy in collaborative machine learning scenarios, while maintaining high levels of accuracy on legitimate data.

Overall, the claims provide a novel approach to enhancing the security and resilience of deep neural networks against adversarial attacks in the context of federated learning.

In one embodiment, the DNN is trained using a combination of federated learning and transfer learning, where the DNN is first pre-trained on a large, diverse dataset, and then fine-tuned using federated learning on the data available on each participant's device, to further improve its performance on the task at hand.

In one embodiment, the GAN model used in the federated learning-based adversarial training includes a multi-task learning component, where the generator model is trained to generate adversarial examples that not only fool the discriminator model, but also lead to a high accuracy on the task at hand.

In one embodiment, the model-based defense technique includes using a reinforcement learning technique to determine the optimal defensive actions to take based on the output of the separate model used for detecting and classifying adversarial examples.

In one embodiment, the separate model used for detecting and classifying adversarial examples is a hybrid model that combines both rule-based and learning-based approaches, where the rule-based component includes pre-defined heuristics for detecting common types of adversarial examples, and the learning-based component is trained using data from diverse types of adversarial attacks.

In one embodiment, the model-based defence technique includes using a feedback loop to update the parameters of the DNN in real time based on the output of the separate model used for detecting and classifying adversarial examples, such that the DNN becomes more resilient to future adversarial attacks.

In one embodiment, the federated learning-based approach includes using a dynamic weighting scheme to assign more weight to participants with higher data quality or expertise, thereby improving the overall performance and robustness of the trained DNN.

Overall, these claims highlight additional novel and inventive features of the proposed approach, such as the use of transfer learning, multi-task learning, reinforcement learning, and hybrid model-based defence techniques, as well as the use of dynamic weighting schemes to improve performance and robustness in federated learning scenarios.

In one embodiment, the evaluation and adjustment steps are performed iteratively until the desired level of adversarial robustness is achieved. In one embodiment, a surrogate model is used to estimate the gradients of the DNN with respect to the adversarial examples, and incorporating these gradients into the training process. In one embodiment, a model-agnostic meta-learning (MAML) approach is used to adapt the DNN to new adversarial examples during inference.

In one embodiment, the FL network includes multiple clients, each having a local dataset and a local DNN model, and a central server for coordinating the training process. In one embodiment, the training process includes exchanging the model updates between the clients and the central server, while preserving the privacy of the local data using secure aggregation techniques.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A method for deep neural network based cyber security using a federated learning-based generative adversarial network, comprising:

receiving a dataset of network traffic that includes both clean traffic and malicious traffic;

pre-processing the dataset by removing irrelevant features of the dataset and normalizing remaining features of the dataset;

defining an architecture of a deep neural network (DNN) model, the architecture comprising: a number of hidden layers; a number of neurons in each layer; at least one activation function; at least one optimization process; and a plurality of hyperparameters, the hyperparameters comprising a learning rate and a regularization parameter;

training the DNN model on the dataset as pre-processed using the hyperparameters, wherein training the DNN model comprises:

partitioning the dataset into a plurality of subsets, and assigning each of the plurality of subsets to a different one of a plurality of devices in a federated learning network;

training a local DNN model by each of the plurality of devices on its respective dataset using a stochastic gradient descent (SGD) optimizer and sending, by each of the plurality of devices, model updates to a central server;

aggregating the model updates by the central server as received using a weighted averaging to create a global model;

sending the global model to the plurality of devices for a next round of training; and generating additional samples to increase diversity of the dataset and continuing to train the DNN model using a generative adversarial network (GAN) comprising a generator network and a discriminator network, wherein the generator network is trained on aggregated data from a federated learning (FL) process and the discriminator network is trained on a clean subset of the dataset, wherein the GAN is trained using a Wasserstein GAN (WGAN) process and a stability of the WGAN is improved using a gradient penalty regularization, wherein the generator network is trained to generate samples such that the discriminator network has difficulty distinguishing the generated samples from real samples, wherein a portion of the samples generated by the generator network comprises synthetic network traffic flows encoded using a one-hot encoding process that represents different features of each of the synthetic network traffic flows;

detecting anomalies in the network traffic using the DNN model as trained to generate detection results, wherein the DNN model as trained identifies patterns indicative of attacks by classifying traffic flows as either benign or malicious using a binary classification approach, wherein the anomalies comprise cyber security threats, the cyber security threats comprising malware, network intrusion, and data exfiltration evaluating an accuracy of the DNN using metrics comprising a confusion matrix, a receiver operating characteristic (ROC) curve, and an area under curve (AUC);

performing an action to mitigate the cyber security threats based on the anomalies as detected, the action comprising at least one of blocking suspicious network traffic and isolating infected devices; and fine-tuning the DNN model on device-specific data using the SGD optimizer to adapt the DNN model to specific characteristics of data of each of the plurality of devices.

2. The method of claim 1, further comprising:

training the local DNN models on each of the plurality of devices using the SGD optimizer based at least in part on the hyperparameters, wherein the SGD optimizer trains the local DNN models using a learning rate of 0.001, a momentum of 0.9, and a batch size of 32;

wherein the weighted averaging uses a number of samples in each of the plurality of subsets of the dataset to ensure that the global model is representative of an entire dataset; and wherein the local DNN models are trained on decentralized data using the federated learning network to preserve user privacy.

3. The method of claim 1, wherein the GAN is further trained using the learning rate of 0.0002, a batch size of 64, and a number of training epochs of 50,000 to generate the samples.

4. The method of claim 1, wherein fine-tuning the DNN model comprises using predetermined hyperparameters, the predetermined hyperparameters comprising a learning rate of 0.0001 and a number of fine-tuning epochs being 10.

5. The method of claim 2, wherein the DNN model comprises a convolutional neural network (CNN), a recurrent neural network (RNN), or a combination of both a CNN and an RNN, and wherein the hyperparameters comprise a learning rate of 0.001, two hidden layers with 512 and 256 neurons respectively, and a L2 regularization parameter of 0.001.

6. The method of claim 1, further comprising improving adversarial robustness of the DNN model by:

augmenting the dataset with adversarial examples generated using a fast gradient sign process or a projected gradient descent process;

training the DNN model on the dataset as augmented using the learning rate, the number of hidden layers, and the number of neurons in each layer;

evaluating adversarial accuracy and adversarial robustness of the DNN model using additional metrics comprising an adversarial accuracy, an adversarial loss, and perturbational robustness; and applying a defense process comprising adversarial training, input preprocessing, and model-based defense to improve the adversarial robustness of the DNN model.

7. The method of claim 6, wherein the fast gradient sign process or the projected gradient descent process used to generate the adversarial examples perturbs input data by adding noise in a direction that maximizes a loss function.

8. The method of claim 1, wherein applying the defense techniques comprises:

applying the adversarial training by retraining the DNN model on the dataset as augmented that includes both clean traffic and the adversarial examples, wherein the adversarial examples are generated using hyperparameters comprising a magnitude of perturbation, a number of iterations, and a step size;

applying the input preprocessing by transforming input data using a smoothing filter or a denoising filter; and applying the model-based defenses by modifying the architecture or the hyperparameters of the DNN model to reduce impact of the adversarial examples.

9. The method of claim 1, further comprising:

selecting the at least one activation function from rectified linear units (ReLU), sigmoid functions, or hyperbolic tangent (tanh) functions;

adjusting at least one of the hyperparameters and the architecture of the DNN model based on the accuracy as evaluated to improve performance of the DNN model; and pre-training the DNN model on a large, diverse dataset prior to the training using the federated learning network, and then performing the fine-tuning using the federated learning network on the device-specific data to further improve performance of the DNN model.

10. The method of claim 1, further comprising improving an adversarial robustness of the DNN model using adversarial training in the federated learning network by:

augmenting the dataset with adversarial examples generated using a fast gradient sign process or a projected gradient descent process;

training the DNN model on the dataset as augmented using the learning rate, the number of hidden layers, and the number of neurons in each layer;

evaluating adversarial accuracy and adversarial robustness of the DNN model using metrics comprising an adversarial accuracy, an adversarial loss, and a perturbational robustness; and applying adversarial training to the DNN model by retraining the DNN model on the dataset as augmented that includes both clean and adversarial examples, wherein the adversarial examples are generated using a magnitude of perturbation, a number of iterations, and a step size.

11. The method of claim 1, further comprising improving adversarial robustness of the DNN model using model-based defenses in the federated learning network by:

modifying the architecture or the hyperparameters of the DNN model to reduce impact of adversarial examples;

evaluating adversarial accuracy and adversarial robustness of the DNN model using an adversarial accuracy, an adversarial loss, and a perturbational robustness; and adjusting the architecture or the hyperparameters of the DNN model based on the adversarial accuracy and the adversarial robustness of the DNN model, wherein the model-based defenses comprise at least one of: adding a regularization term to a loss function of the DNN model to penalize large gradients and limit impact of the adversarial examples; adding an additional hidden layer to the DNN model to learn a mapping from an input space to a higher-dimensional feature space to reduce impact of adversarial perturbations; and using a feedback loop to update the hyperparameters of the DNN model in real time based on output of a separate model used for detecting and classifying adversarial examples to increase resilience of the DNN model to future adversarial attacks.

12. The method of claim 1, further comprising verifying the adversarial robustness of the DNN model against a black-box attack and a white-box attack using a success rate metric and a transferability metric of adversarial examples.

13. The method of claim 1, further comprising improving adversarial robustness of the DNN model using model-based defenses in the federated learning network by:

modifying the architecture or the hyperparameters of the DNN model to reduce impact of adversarial examples using adversarial training, virtual adversarial training, and defensive distillation;

evaluating adversarial accuracy and adversarial robustness of the DNN model using an adversarial loss and perturbational robustness, and using a model-based defense process to detect and classify the adversarial examples;

adjusting the architecture or the hyperparameters of the DNN model based on the adversarial accuracy and the adversarial robustness as evaluated using fine-tuning, ensembling, and regularizing;

testing the DNN model against adversarial attacks comprising evasion, poisoning, and model inversion attacks using a success rate and a detection rate;

repeating the modifying, evaluating, adjusting, and testing in a continual learning process to maintain the adversarial robustness of the DNN model against new and evolving adversarial attacks; and using a surrogate model to estimate gradients of the DNN model in association with the adversarial examples, incorporating the gradients into the training of the DNN model, and using a model-agnostic meta-learning (MAML) process to adapt the DNN model to new adversarial examples during inference.

14. The method of claim 13, wherein:

the modifying the architecture or the hyperparameters of the DNN model comprises adding defensive layers including a randomization layer or a denoising layer, or increasing depth or width of the DNN model;

the adjusting the architecture or the hyperparameters of the DNN model is performed using techniques comprising adversarial training, regularization, and fine-tuning;

the adversarial training comprises generating adversarial examples based on data available on each of the plurality of devices, using the GAN trained in the federated learning network, and using the adversarial examples as generated to train the DNN model to enhance robustness against adversarial attacks;

the GAN comprises the generator network and the discriminator network, wherein the generator network is trained to generate adversarial examples that are classified as benign by the discriminator network, while the discriminator network is trained to differentiate between benign and adversarial examples;

the GAN includes a multi-task learning component, wherein the generator network is trained to generate adversarial examples that fool the discriminator network and lead to high accuracy on a classification task; and the federated learning network uses a dynamic weighting scheme to assign more weight to devices with higher data quality or expertise, thereby improving overall performance and robustness of the DNN model as trained.

15. The method of claim 13, wherein the model-based defenses further comprise:

using a separate model trained on a different dataset to detect and classify adversarial examples;

triggering defensive actions based on output of the separate model, the defensive actions comprising input sanitization or model retraining;

regularly updating the separate model to adapt to new types of adversarial attacks using a diverse set of adversarial attacks and defense techniques;

determining optimal defensive actions using a reinforcement learning technique based on the output of the separate model; and implementing the separate model as a hybrid model that combines rule-based and learning-based approaches, wherein a rule-based component includes pre-defined heuristics for detecting common types of adversarial examples, and a learning-based component is trained using data from diverse types of adversarial attacks.

16. The method of claim 1, further comprising:

receiving a target mapping that maps participant-specific data to an objective;

distributing coefficients of a mapper to the plurality of devices to implement distributed training of the mapper, wherein each participant has access to one or more of the plurality of devices;

processing the participant-specific data through the coefficients of the mapper at respective devices to generate participant-specific gradients during the distributed training; and combining the participant-specific gradients to produce combined gradients that collectively meet the target mapping.

* * * * *